March 14, 1967

A. L. CROWSON 3,308,790

LIVESTOCK TIPPING TABLE

Filed Sept. 29, 1965

ALBERT L. CROWSON
INVENTOR

BY
BUCKHORN, BLORE, KLARQUIST & SPARKMAN
ATTORNEYS

March 14, 1967   A. L. CROWSON   3,308,790
LIVESTOCK TIPPING TABLE
Filed Sept. 29, 1965   2 Sheets-Sheet 2
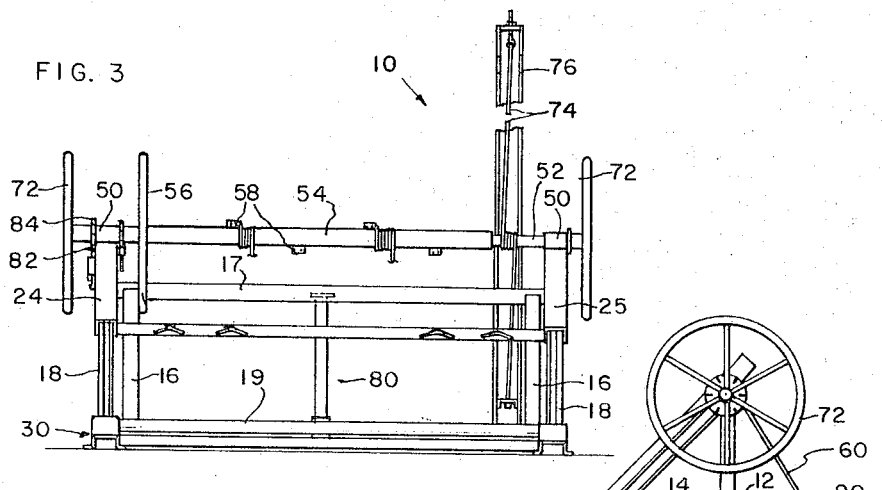
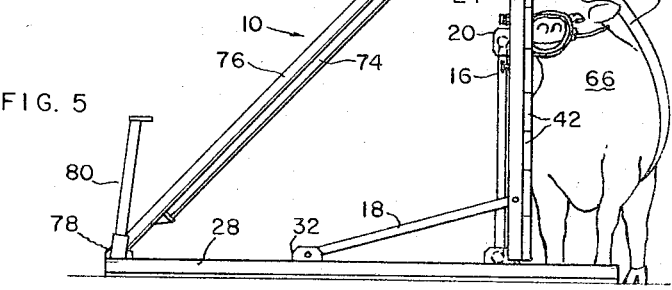
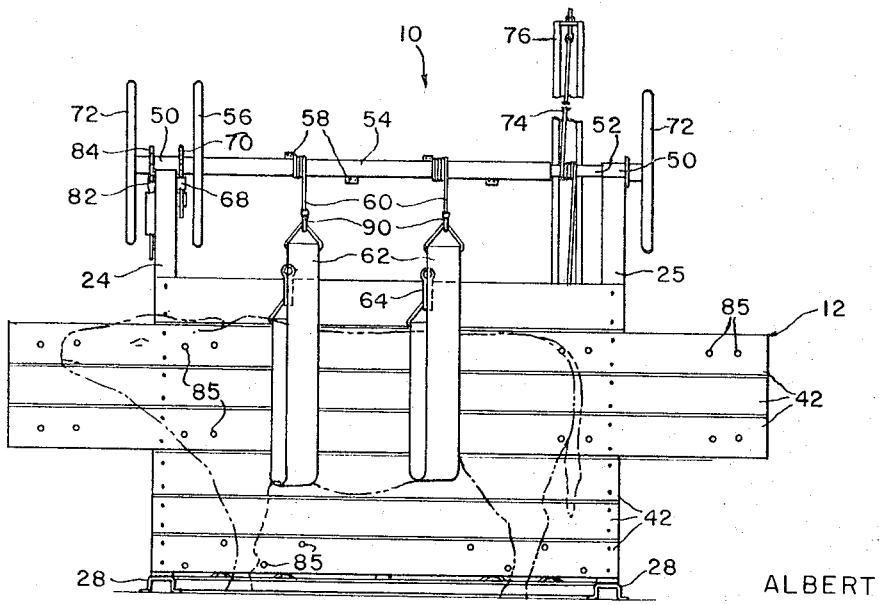
ALBERT L. CROWSON
INVENTOR
BY
BUCKHORN, BLORE, KLARQUIST & SPARKMAN
ATTORNEYS

United States Patent Office 3,308,790
Patented Mar. 14, 1967

3,308,790
LIVESTOCK TIPPING TABLE
Albert L. Crowson, Baker, Oreg., assignor to Commercial Welding Co., Inc., Baker, Oreg., a corporation of Oregon
Filed Sept. 29, 1965, Ser. No. 491,170
5 Claims. (Cl. 119—103)

This invention relates to a livestock tipping table, and more particularly to a table which lifts an animal secured thereto while laying the animal on its side.

An object of the invention is to provide a new and improved livestock tipping table.

Another object of the invention is to provide a table which lifts an animal secured thereto while laying the animal on its side.

A further object of the invention is to provide a livestock tipping table which may be easily swung with an animal thereon between a vertical position and a horizontal position.

Yet another object of the invention is to provide a livestock tipping table in which an operating table thereof is supported by pivotal legs at all times, and a swinging mechanism which takes very little load from the table and the animal thereon.

A still further object of the invention is to provide a livestock tipping table in which tie clips are located in convenient, easily accessible positions.

The invention provides a livestock tipping table in which an operating table is mounted for movement between a substantially vertical position and a substantially horizontal position. The operating table is mounted on two pairs of pivotal legs which serve to support substantially the entire weight of the table and the load of an animal thereon when the table is in a position inclined to the vertical. Preferably there is provided a capstan shaft at the top edge of the table around which several turns of a strand are wound, with the ends of the strand being secured to the upper and lower ends of an elevating channel, which is pivotally secured to the base. When the shaft is rotated, the upper edge of the operating table is moved along the elevating channel. A hollow shaft mounted rotatably on the capstan shaft is designed to wind up thereon cables secured to wide cinches or lift belts passed under an animal to be lifted to take part of the load of an animal and hold the animal against the table when the table is in its vertical position. The table preferably has a plurality of holes extending therethrough to permit ropes to be passed therethrough to secure an animal to the table, with tightening and knotting of the ropes being done from the backside of the table remote from the animal. The table also preferably has tie clips secured thereto for securing further ropes to the animal after the table has been tilted.

A complete understanding of the invention may be obtained from the following detailed description of a livestock tipping table forming a specific embodiment thereof, when read in conjunction with the appended drawings, in which:

FIG. 3 is a front elevation of the table of FIG. 1, with an operating table thereof removed to more clearly illustrate the framework of the tipping table;

FIG. 4 is a view similar to FIG. 3, with the operating table shown in a vertical position; and FIG. 5 is a side elevation view of the tipping table of FIG. 1, with an operating table thereof in a vertical position.

Figure 1:
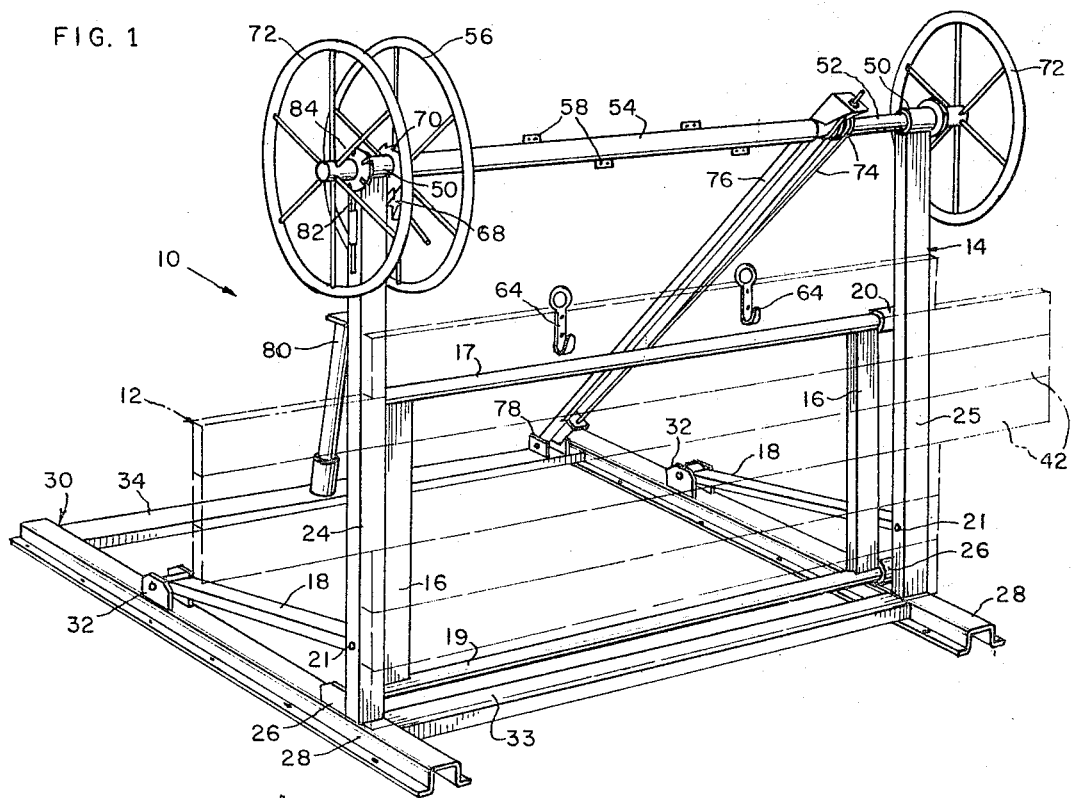
FIG. 1 is a perspective view of a livestock tipping table forming a specific embodiment of the invention.

Referring now in detail to the drawings, there is shown therein a livestock tipping table 10 (FIG. 1) having a planked operating table 12 secured to a tipping frame 14 carried by pairs of channel-like legs 16 and 18. The legs 16 are welded to tubes 17 and 19, and the tube 17 is pivotally secured to aligned pivot brackets 20 of table-mounting channels 24 and 25 of the frame 14. The free ends of the legs 18 are pivotally secured by pins 21 to the channels 24 and 25. The lower ends of the legs 16 are secured to the tube 19 which is connected pivotally to brackets 26 secured to base channels 28 forming a portion of a base 30. The legs 18 are parallel to each other and outside the legs 16, and the lower ends of the legs 18 are pivotally mounted on brackets 32 secured to the channels 28. Crosspieces 33 and 34 are secured to the base channels 28 to form a rigid frame therewith. The front ends of the base channels 28 project out beyond the brackets 26 and may have planking positioned thereon to form a platform. Planking also may be positioned on the base channels behind the brackets 26, if desired, to form a platform or walkway, or, if desired, the base channels may be laid on planking. The crosspiece member 34 secures the rear ends of the base channels 28 rigidly together. The operating platform 12 composed of planks 42 is secured as by bolting, to the channels 24 and 25.

At the upper ends of the channels 24 and 25 there are provided bearing portions 50 (FIGS. 1, 4 and 5) in which a capstan or tilting shaft 52 is journaled, and journaled on the capstan shaft 52 is a hollow lift shaft 54. A handwheel 56 is fixed rigidly to the hollow shaft 54, which has connectors 58 thereon adapted to be connected to strands or cables 60 secured to cinches or belly bands 62, which are secured at their other ends to hooks 64 and adapted to be slung under an animal 66 to be operated on. When the handwheel 56 is rotated and the operating table 12 is in its vertical position, the shaft 54 winds the cables 60 thereon to lift the animal somewhat off the ground and hold the animal against the operating table 12. The shaft 54 may be set in a position holding the cinches 62 and the cable 60 taut by a pawl 68 (FIG. 1) carried by the channel 24 and a ratchet 70 keyed to the hollow shaft 54.

The capstan shaft 52 has handwheels 72 keyed to opposite ends thereof, and has several turns of a strand or cable 74 fastened therearound, the ends of the cable being secured to opposite ends of a table-elevating channel or pivot frame 76 mounted pivotally on a bracket 78 mounted on the crosspiece 34. Either handwheel 72 may be turned to turn the shaft 52 to move the shaft 52 transversely of the shaft along the channel 76 to move the table 14 to any desired degree of tilt between the vertical position thereof shown in FIG. 5 and a substantially horizontal position thereof shown in FIG. 2, in which the shaft 54 rests on a stanchion or stop 80. A manually operable latch 82 is designed to enter slots in a latching wheel 84 keyed to the capstan shaft 52 to hold the table in any desired adjusted position of tilt.

The table 12 has holes 85 (FIG. 4) bored through it, through which ropes 86 (FIG. 2) tied to the halter and neck tie of the animal may be inserted and lashed to tie bars 88 welded to the channel 24. The tie bars 88 are located for easy access to the operator. The holes 85 permit an operator to effect the tying and securing of the ropes while in a position with the plank table between the animal and himself so that he is protected from the animal while securing the animal to the table.

Figure 2:
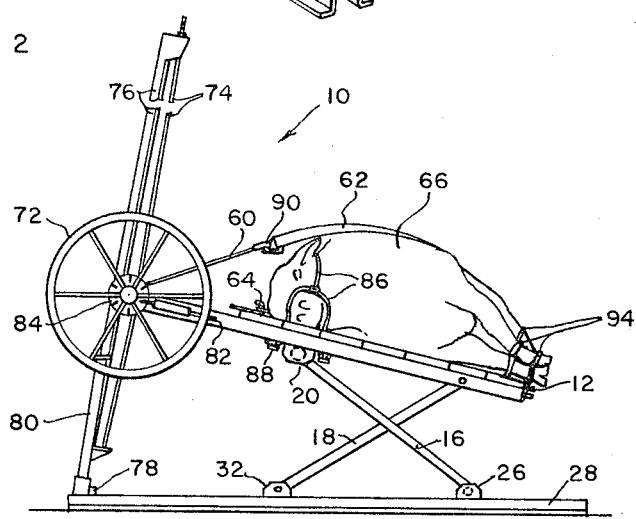
FIG. 2 is a side elevation view of the livestock tipping table of FIG. 1, with an operating table thereof in a substantially horizontal position.

In the use of the tipping table 10 with the table 14 in its vertical position, as shown in FIG. 5, the animal 66 is led up alongside the table, and ropes are passed through the holes 85 from his halter and the like to hold his head against the table with one operator working behind the operating table 12. The cinches 62 are passed under the animal and are hooked onto hooks 90 at the ends of the cables 60. The handwheel 56 then is rotated to tighten the cables 60 to draw the cinches 62 tight under the animal, ropes 94 having been passed through the holes 85 previously to hold the animal's feet adjacent the operating table 12. One handwheel 72 then is rotated to move the shaft 54 downwardly along the cable 74, which swings the table frame 14 and the operating table 12 upwardly and counterclockwise, as viewed in FIGS. 2 and 5, to move the operating table from its vertical position, as shown in FIG. 5, to its horizontal position, as shown in FIG. 2, the tube 17 coming to rest against the stanchion 80 which serves as a support and a stop to limit further swinging of the table frame and the operating table 12. The latch 82 then is set to hold the table in this position.

As the table 12 begins to move from its vertical position shown in FIG. 5, its main movement is vertical so that the animal is primarily lifted. After its feet are off the ground, it is lying against the table and is supported by the bands 62. Then the table swings more horizontally to its position shown in FIG. 2. Substantially all of the weight of the table is supported by the four legs 16 and 18 at all times, and the cable 74 merely serves to apply a slight steadying force to the table and to swing the table as desired when the shaft 52 is turned and no heavy load is thrown on the operating shaft 52. This makes only a minimum of energy needed to pull the table over to its horizontal position and pull it back to the vertical position, an easy operation for one man. Because of the minimum torque at the handwheel 72, it is easy to stop the table and lock it in any position desired as the table is being tipped. Also, by supporting the operating table on the four pivot support legs, the weight of the animal is lifted off its feet before the animal is turned on its side, and this eliminates side pull on the animal's legs as the table is tipped. The tie clips are located on the table in such positions as to make it easy to tie the animal's legs, partially because of the easy access to the backside of the table 12 for the initial tying of the animal, and the tie clips along the tube 19 are in conveniently accessible positions for use after the animal is on its side. The above-described tipping table is simple and lightweight in its construction, and is very easy to operate while being quite flexible in its operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In combination,
a horizontal base,
a table having a top face which is uppermost when the table is in a primarily horizontal position and a bottom edge which is lowermost when the table is in a predetermined, substantially vertical position,
means for strapping an animal to the top face of the table while the table is in said substantially vertical position to hold the animal on the table when the table is moved from said substantially vertical position to said primarily horizontal position,
a first pair of legs connected to the base for pivotal movement relative to the base about a first pivot axis and connected to the table for pivotal movement relative thereto about a second pivot axis parallel to the first pivot axis positioned near to the bottom edge of the table and movable between first substantially horizontal positions, when the table is in its substantially vertical position, to inclined positions, when the table is in its primarily horizontal position,
a second pair of legs connected to the base for pivotal movement relative thereto about a third pivot axis spaced substantially from said first pivot axis and parallel to the first and second pivot axes and crossing the first pair of legs and connected to the table for pivotal movement relative thereto about a fourth pivot axis parallel to the first and second pivot axes and spaced substantially from said second pivot axis and the bottom edge of the table,
the second pair of legs being movable between substantially vertical positions, when the table is in its substantially vertical position and inclined positions crossing the first pair of legs when the table is in its primarily horizontal position,
the pairs of legs serving to lift vertically an animal strapped to the top of the table and quickly lay the animal on its side as the table is moved from its substantially vertical position,
the pairs of legs serving to support and swing the table as the table is moved between its substantially vertical position and its primarily horizontal position,
said second pivot axis being spaced from said first pivot axis sufficiently relative to said predetermined distance that the bottom edge of the table is above the base when the table in in its substantially vertical position,
and actuating means adjustably connecting the table and the base for moving the table between said positions of the table.

2. In combination,
a horizontal base,
a pair of parallel table channels,
a plurality of planks secured to the tops of the channels when the channels are in primarily horizontal positions to form a table having a bottom edge when the channels are in substantially vertical positions,
means for binding an animal to the table when the table is in a substantially vertical position and holding the animal on its side on the table when the table is in a primarily horizontal position,
a first pair of parallel legs connected to the base for pivotal movement relative to the base about a first pivot axis and connected to the channels for pivotal movement relative thereto about a second pivot axis spaced a predetermined distance from the bottom edge of the table and parallel to the first pivot axis,
a second pair of parallel legs of channel-like construction crossing the first pair of parallel legs, connected to the base for pivotal movement relative thereto about a third pivot axis parallel to the first pivot axis and connected to the channels for pivotal movement relative thereto about a fourth pivot axis parallel to the second pivot axis and spaced substantially farther than said second pivot axis from the bottom edge of the table,
the pairs of legs permitting swinging movement of the table from a substantially vertical position to a primarily horizontal position,
said second pivot axis being spaced from said first pivot axis sufficiently relative to said predetermined distance that the bottom edge of the table is above the base when the table is in its substantially vertical position,
and actuating means adjustably connecting the base and the table for moving the table between said positions,
the first pair of parallel legs crossing the second pair of parallel legs, the first pair of legs being in primarily horizontal positions and the second pair of legs being in substantially vertical positions when the table is in its vertical position and the pairs of legs being inclined in opposite directions and crossing each other when the table is in its primarily horizontal position,
the pairs of legs serving to quickly tilt the table and lay the animal on its side as the table is moved from its substantially vertical position toward its primarily horizontal position.

3. In combination,
a base,
a table,
means mounting the table pivotally on the base,
an elongated pivot frame secured pivotally to the base and extending past one edge of the table,
capstan means mounted on said edge of the table, manually operable means connected to the capstan means and carried by the table for rotating the capstan means,
and a cable extending around the capstan means and secured at opposite ends thereof to opposite ends of the pivot frame for moving said edge of the table along the pivot frame to swing the table relative to the base when the capstan means is turned.

4. In combination,
a base,
a table mounted for tilting movement on the base,
a table tilting shaft mounted rotatably on one edge of the table,
a hollow shaft mounted rotatably on the tilting shaft,
means mounting the table for movement between a substantially vertical position in which said one edge is uppermost and a second position in which the table is inclined substantially relative to the vertical,
belly band means having one end secured to the table and the other end secured to the hollow shaft,
means for rotating the hollow shaft to snug the belly band means to an animal standing at one side of the table when the table is in its vertical position,
an elongated frame member pivoted at one end to the base and extending upwardly therefrom past the table-tilting shaft,
and means operatively connecting the frame member and the table-tilting shaft for moving said one edge of the table along the frame member.

5. In combination,
a base,
a table,
means mounting the table on the base for movement between a vertical position and a second position inclined substantially relative to the vertical,
a capstan mounted on the table near the upper edge of the table when the table is in its vertical position,
an elongated frame secured pivotally to the base and extending beyond the capstan,
a strand secured at the ends thereof to the frame and wound a plurality of turns around the capstan,
and means on the table for rotating the capstan to move the table between said positions.

References Cited by the Examiner
UNITED STATES PATENTS

| | | | |
|---|---|---|---|
| 350,646 | 10/1886 | Tiffany | 119—103 |
| 541,360 | 6/1895 | Kaysan | 269—323 |
| 2,000,122 | 5/1935 | Camerson | 119—103 |
| 2,967,510 | 1/1961 | Stoody | 119—103 |

SAMUEL KOREN, *Primary Examiner.*

HUGH R. CHAMBLEE, *Examiner.*